United States Patent
Galvez et al.

(10) Patent No.: US 10,635,057 B2
(45) Date of Patent: Apr. 28, 2020

(54) SYSTEM AND METHOD FOR DETECTING ROOM OCCUPANCY WITH BEAMFORMING MICROPHONE ARRAYS

(71) Applicant: Sensormatic Electronics, LLC, Boca Raton, FL (US)

(72) Inventors: Miguel Galvez, Plaistow, NH (US); Walter A. Martin, Ballymena (GB); Danny Hyun, Irvine, CA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 16/111,991

(22) Filed: Aug. 24, 2018

(65) Prior Publication Data

US 2020/0064791 A1    Feb. 27, 2020

(51) Int. Cl.
*G05B 15/02* (2006.01)
*H04R 3/00* (2006.01)
*H04R 1/40* (2006.01)
*G10L 25/51* (2013.01)

(52) U.S. Cl.
CPC ........... *G05B 15/02* (2013.01); *G10L 25/51* (2013.01); *H04R 1/406* (2013.01); *H04R 3/005* (2013.01)

(58) Field of Classification Search
None
See application file for complete search history.

(56) References Cited

U.S. PATENT DOCUMENTS

| 7,796,471 B2 * | 9/2010 | Guigne ............ G01S 5/22 367/125 |
| 2015/0006218 A1 | 1/2015 | Klemm et al. |
| 2015/0242801 A1 | 8/2015 | Cudak et al. |
| 2016/0069584 A1 | 3/2016 | Holaso et al. |

(Continued)

FOREIGN PATENT DOCUMENTS

| JP | H04124541 | 4/1992 |
| WO | WO 2018112095 | 6/2018 |

OTHER PUBLICATIONS

International Search Report and Written Opinion of the International Searching Authority, dated Oct. 28, 2019, from International Application No. PCT/US2019/046689, filed on Aug. 15, 2009. 26 pages.

(Continued)

*Primary Examiner* — Paul W Huber
(74) *Attorney, Agent, or Firm* — HoustonHogle LLP

(57) ABSTRACT

A building automation system generates occupancy information for occupants of spaces of a building (e.g. quantity, identity and/or location of the occupants) based on occupancy sensors in the spaces. The occupancy sensors capture speech sounds originating from one or more occupants of the spaces and/or ultrasonic emissions originating from one or more user devices of the occupants are via microphone arrays. Audio data based on the captured sound is then generated. Position information for the sources of the sound is determined based on the audio data, and the audio data is enhanced based on the position information via a beamforming process. Occupancy information for the spaces is generated based on the audio data. Environmental conditions of the spaces are controlled based on the presence, absence, position, orientation, distribution and/or preferences of the occupants in the space.

27 Claims, 10 Drawing Sheets

(56) References Cited

U.S. PATENT DOCUMENTS

| | | | |
|---|---|---|---|
| 2016/0195856 A1 | 7/2016 | Spero | |
| 2016/0300468 A1* | 10/2016 | Stricker | G08B 21/02 |
| 2016/0301373 A1 | 10/2016 | Herman et al. | |
| 2017/0123391 A1 | 5/2017 | Sinha et al. | |
| 2017/0176961 A1 | 6/2017 | Tirpak | |
| 2017/0309142 A1 | 10/2017 | Phillips | |
| 2018/0047230 A1* | 2/2018 | Nye | G05B 15/02 |
| 2018/0090138 A1* | 3/2018 | Finn | G10L 15/22 |
| 2018/0330589 A1* | 11/2018 | Horling | G08B 13/1672 |
| 2019/0053329 A1* | 2/2019 | Deros | H04W 4/00 |

OTHER PUBLICATIONS

Partial International Search, dated Nov. 22, 2019, from International Application No. PCT/US2019/046683, filed on Aug. 15, 2019. 9 pages.

* cited by examiner

SYSTEM AND METHOD FOR DETECTING ROOM OCCUPANCY WITH BEAMFORMING MICROPHONE ARRAYS

RELATED APPLICATIONS

This application is related to U.S. application Ser. No. 16/111,981 filed on Aug. 24, 2018, entitled "System and Method for Controlling Building Management Systems for Scheduled Events," now U.S. Patent Publication No.: 2020/0064790 A1, which is incorporated herein by reference in its entirety.

BACKGROUND OF THE INVENTION

Building management systems such as building automation systems, security systems and access control systems are often installed within premises such as commercial, residential, or governmental buildings. Examples of these buildings include offices, hospitals, warehouses, public infrastructure buildings including subways and bus terminals, multi-unit dwellings, schools or universities, shopping malls, government offices, and casinos.

Building automation systems, in particular, will typically include one or more building automation control panels and distributed devices that control and monitor the physical plant aspects of a building and aspects of business-specific electrical, computer, and mechanical systems. The physical plant typically includes heating, ventilation, and air conditioning (HVAC) systems, elevators/escalators, lighting and power systems, refrigeration and coolant systems, and air and/or water purification systems, in examples. HVAC systems typically include air handlers and systems of ducts and vents for circulating air throughout the building. Business-specific systems include computer systems, manufacturing systems that include various types of computer-aided machinery and test equipment, and inventory control and tracking systems, in examples. Sensors for building automation systems include, for example, temperature sensors, light sensors, humidity sensors, volatile organic compound (VOC) sensors. User interface elements for building automation systems might include touchscreen displays (for example, as part of a thermostat or other indicator). Actuators for building automation systems include dampers, chillers, smart lighting systems, motorized window shades, projectors and projector screens, and other mechanical equipment, to list a few examples.

Recently, it has been proposed to use connected services systems to monitor building management systems. Connected services systems are remote systems that communicate with the building management systems and are sometimes administered by separate business entities than the owners and/or occupants of the buildings, which contain the building management systems. For example, the connected services system can be administered by a building management system manufacturer and/or an entity providing service on the building management systems.

SUMMARY OF THE INVENTION

In general, there is a need for building and space automation systems that aid occupants in using the buildings and spaces of the buildings more intelligently and efficiently. Such a system would generally employ sensors for discerning which occupants are occupying which spaces of the building at any moment. The system would use occupancy information (e.g. quantities, identities, and locations of present occupants in the spaces) to determine how the building amenities can be used most efficiently. In the presently disclosed building automation system, occupancy sensors are deployed in and around the spaces of the building in order to generate the occupancy information.

According to one embodiment, the occupancy sensor comprises a beam forming microphone array. The occupancy sensor is positioned, for example, on the ceiling of the space, and the microphones of the microphone array detect speech sounds from the occupants present within the space. The building automation system determines how many occupants are in the space based on the speech sounds. The building automation system can generate information about locations of occupants within the space and control environmental conditions of the space in particular ways based on the relative location of the occupants (e.g. seating configuration). In one example, if the occupants are sitting in chairs that face away from the windows, the shades can be raised more than normal to allow additional daylight into the room. In another example, if the occupants are situated in one part of a room, the lighting can be made brighter in that area and darker in other, empty areas.

According to an alternative embodiment, the occupancy sensor comprises antennas or receivers that detect ultrasonic emissions emanating from mobile computing devices of occupants of the space. For example, the building automation system determines the quantity of occupants in the space based on how many user devices were detected.

In general, according to one aspect, the invention features, a method of operation of a building automation system of a building. Sound is captured in spaces of the building and audio data based on the captured sound is then generated. Occupancy information for the spaces is generated based on the audio data. Environmental conditions of the spaces are then controlled based on the occupancy information.

In embodiments, the speech sounds originating from one or more occupants of the spaces and/or ultrasonic emissions originating from one or more user devices of the occupants are captured via microphone arrays. Position information for the sources of the sound is determined based on the audio data, and the audio data is enhanced based on the position information via a beamforming process. The occupancy information includes quantity, identity and/or location information for occupants of the space. In one example, the occupancy information is generated based on identification information for occupants of the spaces, which in turn is generated based on the audio data. The environmental conditions are controlled based on position, orientation and/or distribution information for the occupants, possibly based on the occupants' preference information.

In general, according to another aspect, the invention features a building automation system of a building, the building automation system comprising occupancy sensors, an occupancy module, and a space automation module. The occupancy sensors capture sounds in spaces of the building and generate audio data based on the captured sound. The occupancy module generates occupancy information for the spaces based on the audio data generated by the occupancy sensors. The space automation module controls environmental conditions of the spaces based on the occupancy information generated by the occupancy module.

In general, according to another aspect, the invention features a system for detecting occupancy in spaces of a building. The system comprises occupancy sensors for capturing sounds in the spaces and generating audio data based on the captured sound and an occupancy module for generating occupancy information for the spaces based on the audio data generated by the occupancy sensors.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
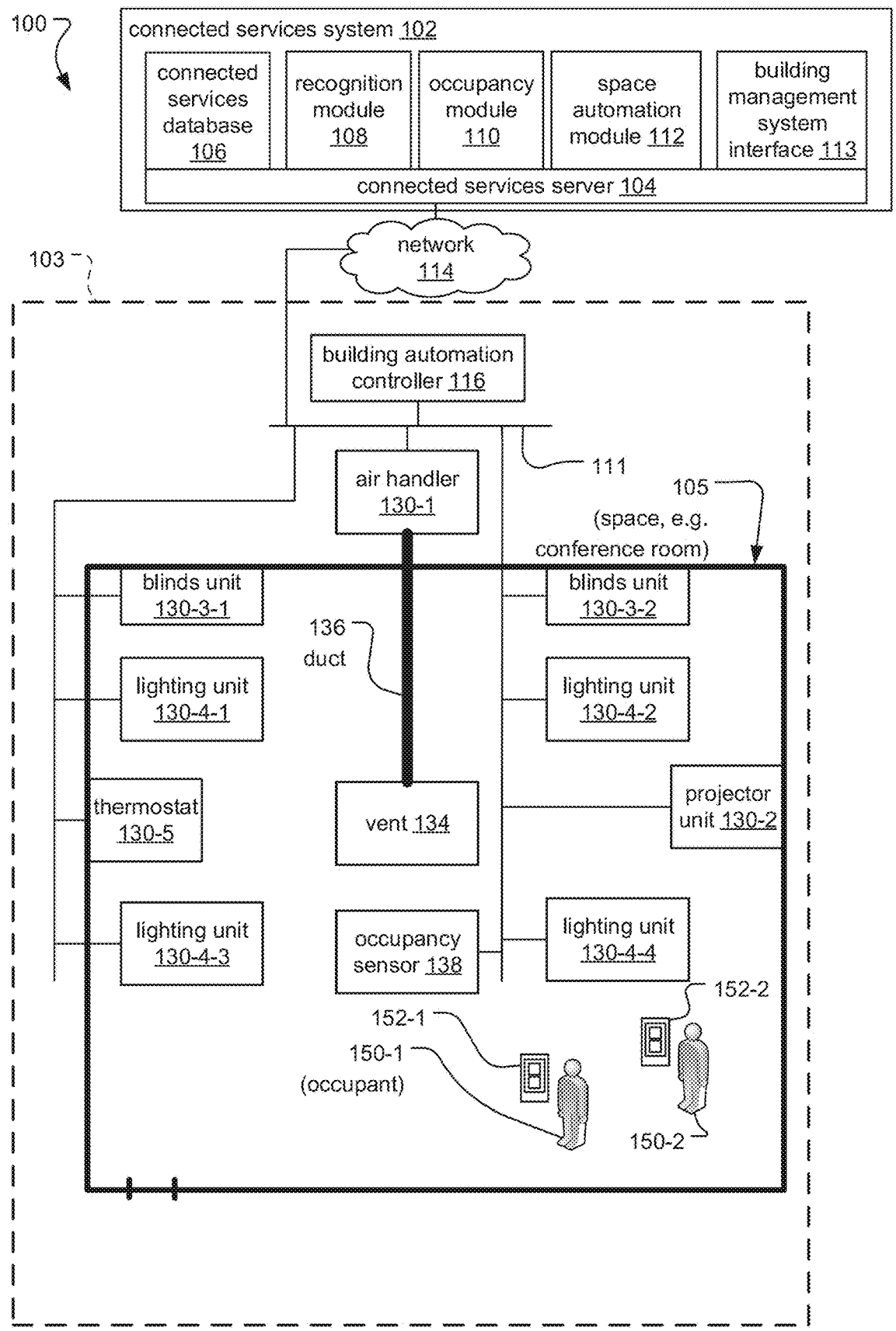
FIG. 1 is a schematic diagram showing an exemplary occupancy detection system according to the present invention.

FIG. 1 is a schematic diagram showing an exemplary occupancy detection system 100 according to the present invention.

The occupancy detection system 100 communicates with building management systems installed at premises such as a building 103 (e.g. offices, hospitals, warehouses, retail establishments, shopping malls, schools, multi-unit dwellings, government buildings, or casinos).

The building 103 includes one or more spaces 105, which are areas of the building 103 such as offices, conference rooms, departments, workspaces, common areas, recreational areas, and/or laboratories. For the sake of demonstration, the illustrated example shows one space 105. However, buildings 103 can have multiple spaces 105.

Occupants 150 of the building 103 are individuals who might be located anywhere in the building 103 during a normal course of business, including employees of entities occupying the building 103, residents, or visitors, among other examples. The occupants 150 produce speech sounds, for example, during conversations with other occupants 150.

The occupants 150 carry and/or operate mobile computing devices 152, which could be laptop computers, tablet computers, phablet computers (i.e., a mobile device that is typically larger than a smart phone, but smaller than a tablet), or a smart watches, to list a few examples. These mobile computing devices 152 emit ultrasonic emissions, which are sounds with frequencies outside the audible range for humans (e.g. greater than 20,000 Hz). In one example, the mobile computing devices 152 produce ultrasonic emissions at unique frequencies associated with the occupants 150 (e.g. via mobile applications executing on the mobile computing devices).

In the illustrated example, occupants 150-1 and 150-2 are both present in the space 105 and carry mobile computing devices 152-1 and 152-2 respectively.

In general, the building management systems control and monitor various equipment and conditions throughout the building 103 and/or the event spaces 105 and can include building automation systems, fire alarm systems, security systems, and/or access control systems, among other examples.

These building management systems typically include control panels or controllers 116 and distributed devices 130 positioned throughout the building 130. The control panels 116 direct the functionality of the respective building management systems by receiving signals and/or data (for example, from the distributed devices 130), sending instructions, and determining and sending status information or sensor data, among other examples, to be displayed on or utilized by the distributed devices 130.

The distributed devices 130 communicate with their respective control panels 116 via a safety and automation network 111 of the building 103. The safety and automation network 111 supports digital and/or analog communication between the distributed devices 130 and the respective control panels 116. In some embodiments (not illustrated), the distributed devices 130 from multiple different building management systems could all be connected to the same safety and automation network 111.

According to a preferred embodiment depicted in the illustrated example, the building 103 includes a building automation system.

The building automation system, in general, controls and monitors physical plant aspects of the building 103 and aspects of business-specific electrical, computer, and mechanical systems. The building automation system includes a building automation controller 116, which is connected via the safety and automation network 111 to building automation distributed devices 130, including an air handler 130-1, a projector unit 130-2, blinds units 130-3, lighting units 130-4, and a thermostat 130-5. The air handler 130-1 heats, cools and/or circulates air throughout the building 103 via ducts 136 and vents 134. The projector unit 130-2 raises or lowers a projector screen. The blinds units 130-3 control window coverings such as blinds by, for example, raising, lowering, opening, closing and/or controlling other physical mechanisms for adjusting the amount of light allowed to pass through the window. Lighting units 130-4 control illumination (e.g. of the event space 105), for example, via lighting mechanisms such as light bulbs. The thermostat 130-5 generates sensor data indicating climate conditions for particular areas of the building 103 (e.g. via temperature, humidity, and/or other sensors), displays or otherwise indicates status information, receives input indicating climate preferences (e.g. via a touchscreen display or other user interface), and controls the climate conditions by sending the sensor data to the building automation controller 116 and/or sending instructions to the air handler 130-1 based on the sensor data.

The occupancy detection system 100 includes occupancy sensors 138, which, in general, detect the presence of individuals in the spaces 105. More specifically, the occupancy sensors 138 are installed (for example, in the ceiling) in the spaces 105. The sensors generate audio data based on captured speech sounds of occupants 150 and/or ultrasonic emissions from the mobile computing devices 152 of the occupants 150 in the space 105. Based on the captured audio data, the occupancy sensors 138 generate position information with respect to the source of the speech sounds and/or ultrasonic emissions. The occupancy sensors 138 also generate enhanced audio data based on the source position information.

Additionally, the occupancy detection system 100 includes a connected services system 102, which, at a high level, communicates with the building management systems installed at the building 103.

The building automation controller 116, distributed devices 130, and mobile computing devices 152 communicate with the connected services system 102 via a public and/or private network 114, which can be a leased data connection, a private network built for a specific enterprise client and/or a public network 114, in examples. In some cases, the control panels 116 have been given network connectivity to communicate with the connected services system 102; in other cases, testing computers connected to the control panels 116 function as gateways. The mobile computing devices 152 connect to the public network 114 via wireless communication links to a cellular radio tower (not illustrated) of a mobile broadband or cellular network or public and/or private wired data networks such as an enterprise network, Wi-Max, or Wi-Fi network, for example. Additionally, the distributed devices 130 communicate with the connected services system 102 via their respective control panels 116 or more directly via the safety and automation network 111 and the public and/or private network 114.

The connected services system 102 is typically implemented as a cloud system. It can be run on a proprietary cloud system or implemented on one of the popular cloud systems operated by vendors such as Alphabet Inc., Amazon, Inc. (AWS), or Microsoft Corporation.

As a result, the connected services system 102 typically operates on a connected services server system 104. In some cases, this server system 104 is one or more dedicated servers. In other examples, they are virtual servers. The connected services server system 104 also functions as an application server that communicates with the mobile computing devices 152.

The connected services server system 104 executes modules, including a recognition module 108, an occupancy module 110, and a space automation module 112. Each of these modules is associated with separate tasks. In some cases, these modules are discrete modules or they are combined with other modules into a unified code base. They can be running on the same server or different servers, virtualized server system, or a distributed computing system.

The connected services system 104 also includes a connected services database 106, which, in general, stores information about the building 103 and its spaces 105, various building management systems, and the occupants 150.

The occupancy module 110 generates occupancy information for the spaces 105. The occupancy module 110 generates the occupancy information based on the enhanced audio data and source position information received from the occupancy sensors 138 at the spaces 105. The occupancy information includes quantity information (e.g. how many occupants 150 are in the space 105), identification information, and location/position information indicating, for example, where in the space 105 the occupants 150 are located.

The recognition module 108 generates identification information based on the enhanced audio data. The identification information pertains to the occupants 150 and/or the mobile computing devices 152 of the occupants 150, which are the sources of the speech sounds and/or ultrasonic emissions captured in the enhanced audio data. In one example, the recognition module 108 generates the identification information by isolating individual voices based on the enhanced audio data, generating voice sample and/or biometric information based on the enhanced audio data, and comparing the voice sample and/or biometric information to voice print and/or biometric information associated with the occupants 150 stored in the connected services database 106.

The space automation module 112 controls environmental conditions of the building 103 and/or space 105 based on the occupancy information and other information from the connected services database 106 such as layout information associated with the space 105 and/or preference information associated with the occupants 150. In general, the space automation module 112 controls the environmental conditions by sending instructions to the building management systems. In one example, the space automation module 112 sends instructions to the controller 116 and/or distributed devices 130 of the building automation system to brighten lights in areas of the space 105 where occupants 150 were detected dim lights in areas where no occupants 150 were detected via the lighting units 130-4, raise shades more than normal if occupants 150 are positioned in areas where chairs are facing away from windows of the space 105 via the blinds units 130-3, and/or control the temperature of the space 105 based on occupant preferences via the thermostat 130-5 and/or air handler 130-1.

The connected services system 102 also includes a building management system interface 113. The building management system interface 113 operates as the interface between the recognition module 108, occupancy module 110, or space automation module 112 and the control panels 116 or distributed devices 130. In particular, the building management system interface 113 converts instructions from the modules 108, 110, 112 into instructions that are formatted into the protocol implemented by the particular panel 116 or device 130. Additionally, the building management system interface 113 receives information such as device events from the control panels 116 or distributed devices 130 and converts those device events into a uniform format that can be consumed by the modules 108, 110, 112, regardless of the underlying protocol implemented by the panels and distributed devices.

Figure 2:
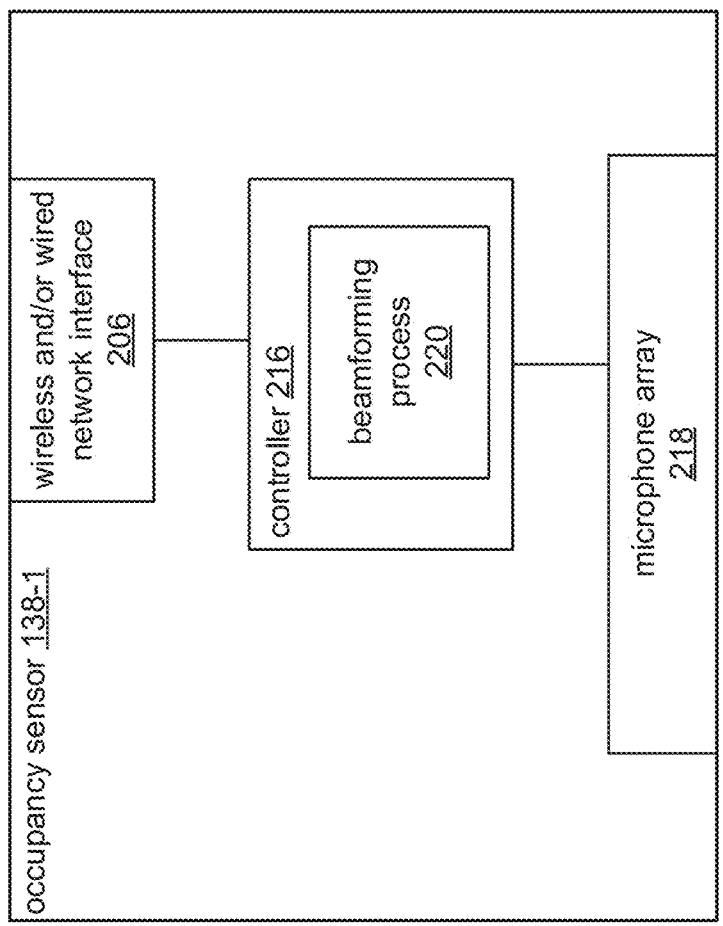
FIG. 2 is a schematic diagram showing an exemplary occupancy sensor, according to an embodiment of the present invention in which the occupancy sensor captures speech sounds produced by occupants present in a space.

FIG. 2 is a schematic diagram showing an exemplary occupancy sensor 138-1, according to one embodiment of the present invention, in which the occupancy sensor 138-1 captures speech sounds. The sources of the speech sounds are, for example, the occupants 150 in the space 105.

The occupancy sensor 138-1 includes a controller 216, a microphone array 218, and a wired and/or wireless network interface 206.

In general, the controller 216 executes firmware instructions and sends instructions to and receives data from the microphone array 218 and network interface 206.

The microphone array 218 captures the speech sounds and generates audio data via a plurality of microphones.

A beamforming process 220 executing on the controller 216 generates speech source position information (e.g. azimuth and/or elevation of the source with respect to the occupancy sensor 138-1) based on the audio data and generates enhanced audio data based on the speech source position information and other information such as properties of the signals captured by the different microphones of the microphone array 218. For example, the beamforming process 220 might generate the source position information by identifying distinct signals representing speech sounds and then calculating the relative position of the sources of the signals based on when the microphones of the microphone array 218 captured the identified signals. In another example, the beamforming process 220 generates the enhanced audio data by combining the streams from the different microphones with different time delays based on the speech source position information and detected properties of the signals and specifically the phase delay between the same sounds (e.g., speech from the same speaker) detected by each of the microphones. The phase delay for the same sounds is then converted into an elevation and azimuth for that speaker. This information is combined with the programmed room dimensions, and the location of the microphone array 218 in the room, allows the beamforming process to resolve the location of the various speakers. For example, knowing the elevation and azimuth and knowing that the microphone array 218 is on 4 meter-high ceiling of the room, enables the beamforming process to locate the speaker assuming that the speakers are standing (producing sound at approximately 3 meters above the plane of the floor or speakers are sitting (producing sounds at approximately 1.5 meters above the plane of the floor.

The speech source position information and the enhanced audio data are sent to the occupancy module 110 via the network interface 206.

Figure 3:
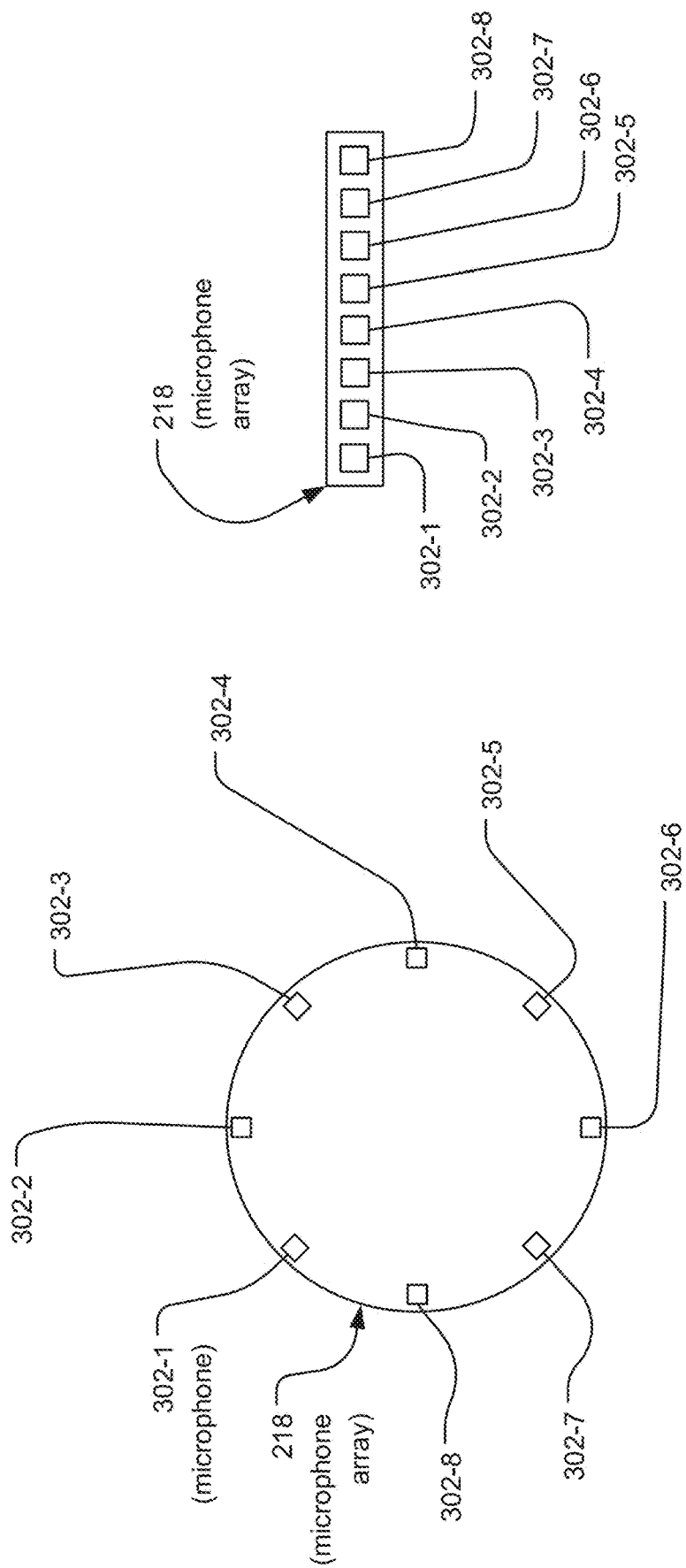
FIG. 3A is a schematic diagram showing an exemplary microphone array of the occupancy sensor according to one embodiment of the present invention.
FIG. 3B is a schematic diagram showing an exemplary microphone array of the occupancy sensor according to an alternative embodiment of the present invention.

In general, FIGS. 3A and 3B are schematic diagrams showing different examples of microphone arrays 218 with microphones 302 arranged according to different spatial configurations. The spatial configuration of the microphones 302 allows the microphones 302 to capture sound from different angles with respect to the sources of the sounds. The beamforming process 220 uses information about the spatial configuration of the microphones 218 as well as differences in the signals from the microphones 220 to determine the direction of the sources and generate the speech source position information. In the illustrated example of FIG. 3A, the microphones 302-1 through 302-8 are arranged circumferentially around the microphone array 218, which has a circular shape. In FIG. 3B, on the other hand, the microphones 302-1 through 302-8 are arranged linearly along the microphone array 218, which has a rectangular shape.

Figure 4:
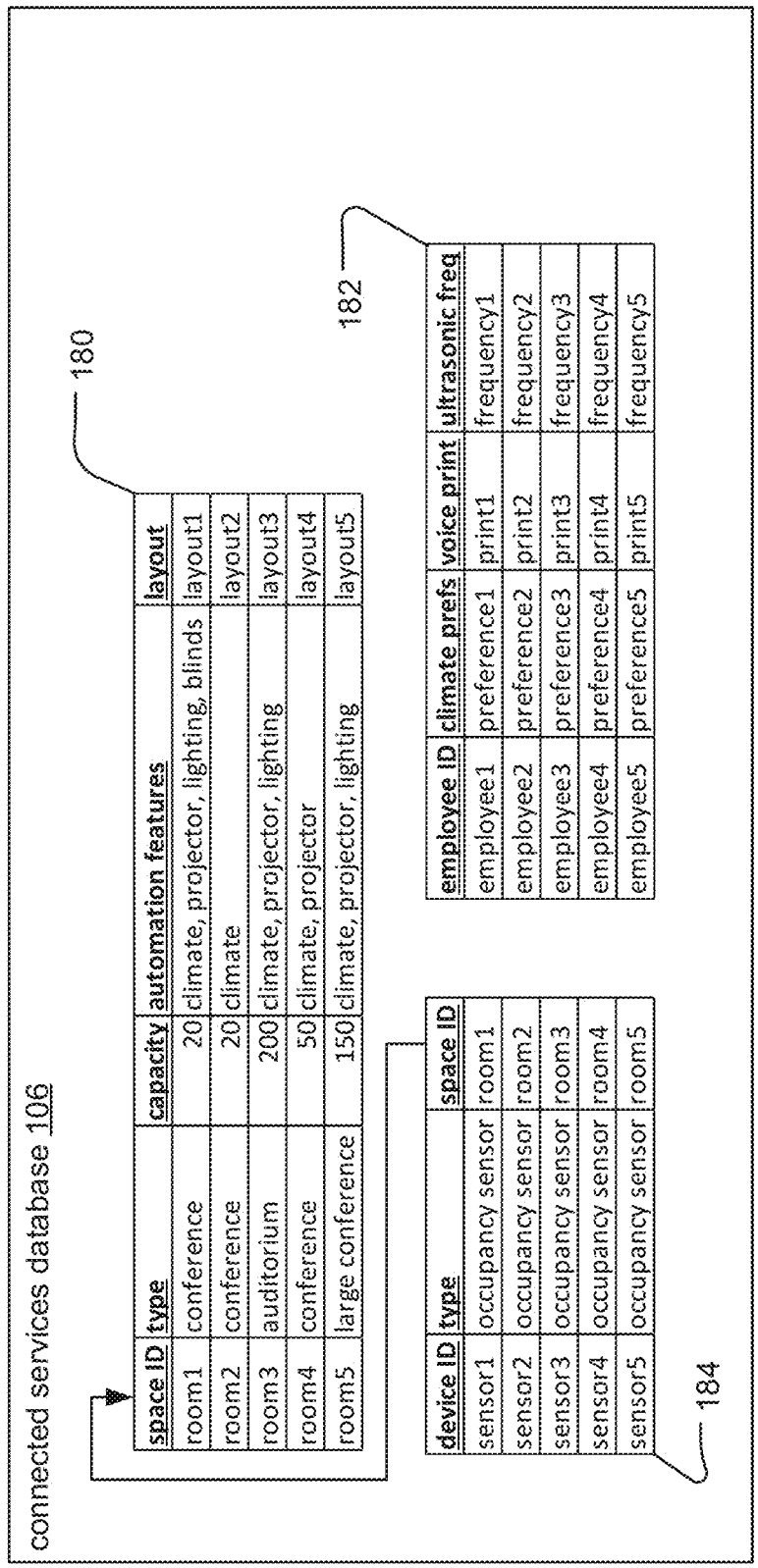
FIG. 4 is a schematic diagram showing an exemplary connected services database of the occupancy detection system.

FIG. 4 is a schematic diagram showing an exemplary connected services database 106. The database 106 includes a space table 180, an occupant table 182, and a device table 184.

The space table 180 includes information about the spaces 105 and includes columns for a space ID, type, capacity, building automation features, and layout. The space ID includes identification information for each space 105 such as a unique identifier. The type column includes descriptive information about the purposes and/or capabilities of the different spaces 105. The capacity column includes capacity information, indicating how many occupants each space 105 can accommodate. The automation features column indicates which building automation features and/or amenities are available to be controlled in each space 105. The layout column includes layout information for the spaces 105 such as where certain fixtures (e.g. seats, windows, projectors, occupancy sensors 138) are located within the space 105, and the orientation of the fixtures with respect to each other. The layout information can be indicated with respect to stored map and/or coordinate information for the building 103, indoor positioning system data, the spatial configurations of the microphones 320 of the microphone array 218, and/or the position and orientation of the occupancy sensor 138 in the space 105, among other examples.

In the illustrated example, the space 105 identified as "room1" in the space table 180 is a conference room that can accommodate 20 occupants, includes climate, projector, lighting and blinds automation capabilities (e.g. via thermostats 130-5, ducts 136, vents 134, projector units 130-2, lighting units 130-4, and blinds units 130-3 installed in the space 105) and has a layout of "layout1."

The occupant table 182 includes information about potential occupants of one or more buildings 103 and/or spaces 105. In embodiments, the occupant table 182 can be or include data from human resources management systems for entities occupying the buildings 103. The occupant table 182 includes columns for employee ID, climate preferences, voice print, and ultrasonic frequency information. The employee ID includes identification information for the occupants 150. The climate preferences column indicates individual preferences for the environmental conditions of areas occupied by the attendees 150, including temperature, humidity, and lighting settings, among other examples. The voice print column includes unique voice print and/or other biometric information associated with each occupant 150, which is used to identify the occupants 150 based on, for example, unique features of their voice. Similarly, the ultrasonic frequency column includes ultrasonic frequency information associated with each occupant 150. The ultrasonic frequency information includes information about the unique ultrasonic frequency of emissions from the occupant's 150 mobile computing device 152, which is used to identify the occupants 150 based on ultrasonic emissions depicted in audio data captured by the occupancy sensors 138.

In the illustrated example, the occupant 150 identified as "employee1" has climate and exercise preferences indicated by "climate1," a voice print indicated by "print1" and ultrasonic frequency information indicated by "frequency1."

The device table 184 includes information about the occupancy sensors 138 and includes columns for device ID, type, and space ID. The device ID column includes identification information for the occupancy sensors 138. The type column includes descriptive information about the type of device (e.g. distinguishing different types of occupancy sensors 138 from each other and/or occupancy sensors 138 from other distributed devices 130). The space ID column includes identifying information about the space 105 where the occupancy sensor 138 is installed with reference to the space ID column of the space table 180.

In the illustrated example, the occupancy sensor 138 identified as "sensor1" is installed in the space 105 identified as "room1" in the space table 180.

Figure 5:
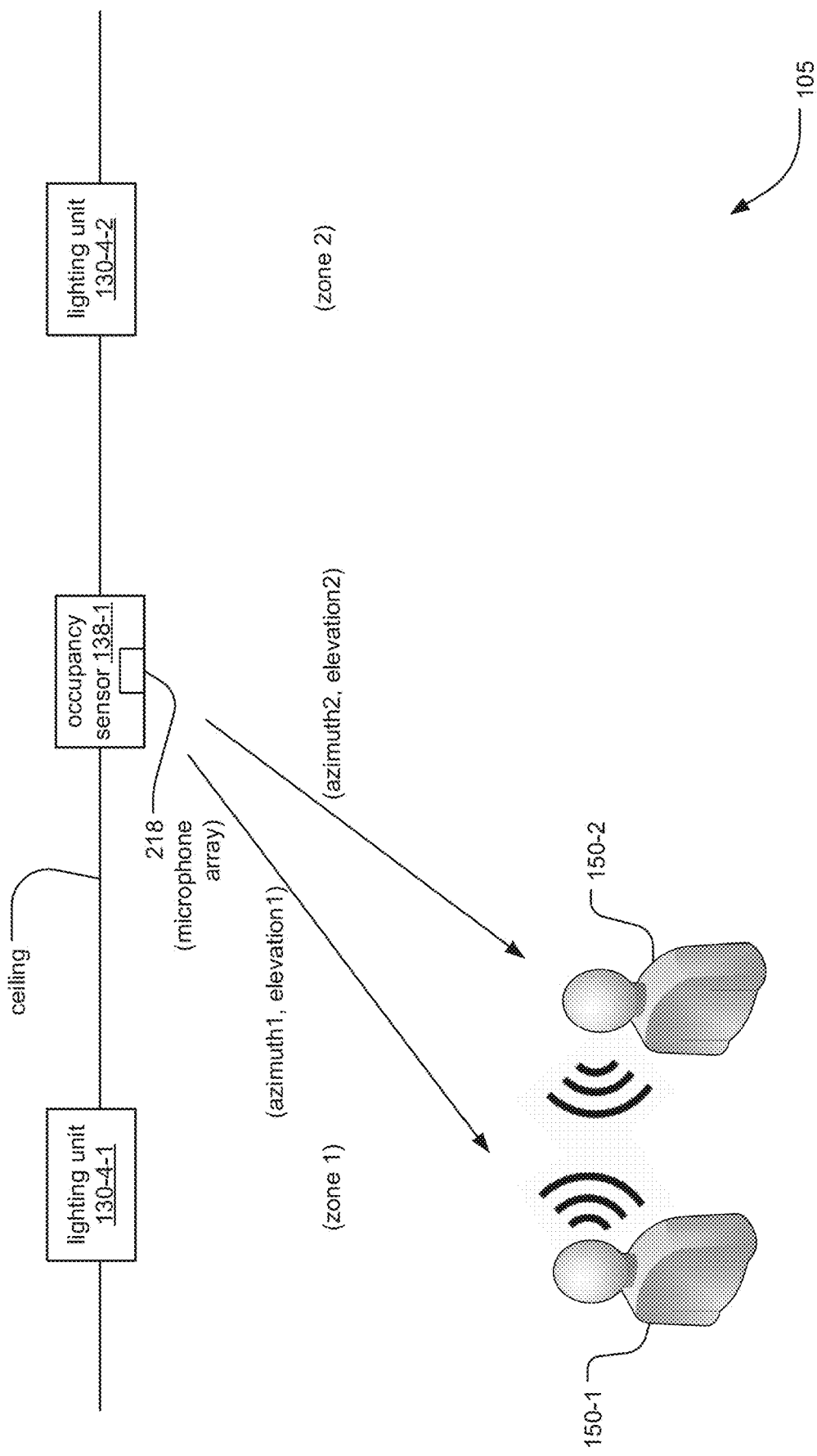
FIG. 5 is a schematic diagram of an exemplary space illustrating how environmental conditions of the space are controlled based on speech sounds captured by the occupancy sensor.

FIG. 5 is a schematic diagram of an exemplary space 105 illustrating how the environmental conditions of the space 105 are controlled based on the speech sounds captured by the occupancy sensor 138-1. In the illustrated example, the occupancy sensor 138-1 is installed on the ceiling of the space 105 between two zones of the space (zone 1 and zone 2). The lighting unit 140-4-1 controls the lighting in zone 1, while the lighting unit 140-4-2 controls the light in zone 2. Two occupants 150-1, 150-2 are located in zone 1 with different relative positions with respect to each microphone 302 of the microphone array 218 of the occupancy sensor 138-1. When the occupants 150 speak to each other, the occupancy sensor 138-1 detects the speech sounds and generates speech source position information (e.g. azimuth and elevation information) indicating the positions of the occupants 150 with respect to the occupancy sensor 138-1. This information will be combined with layout information for the space 105 to, for example, turn on the lighting unit 104-4-1 in zone 1 where the occupants 150 are and turn off the lighting unit 130-4-2 in zone 2, which is empty.

Figure 6:
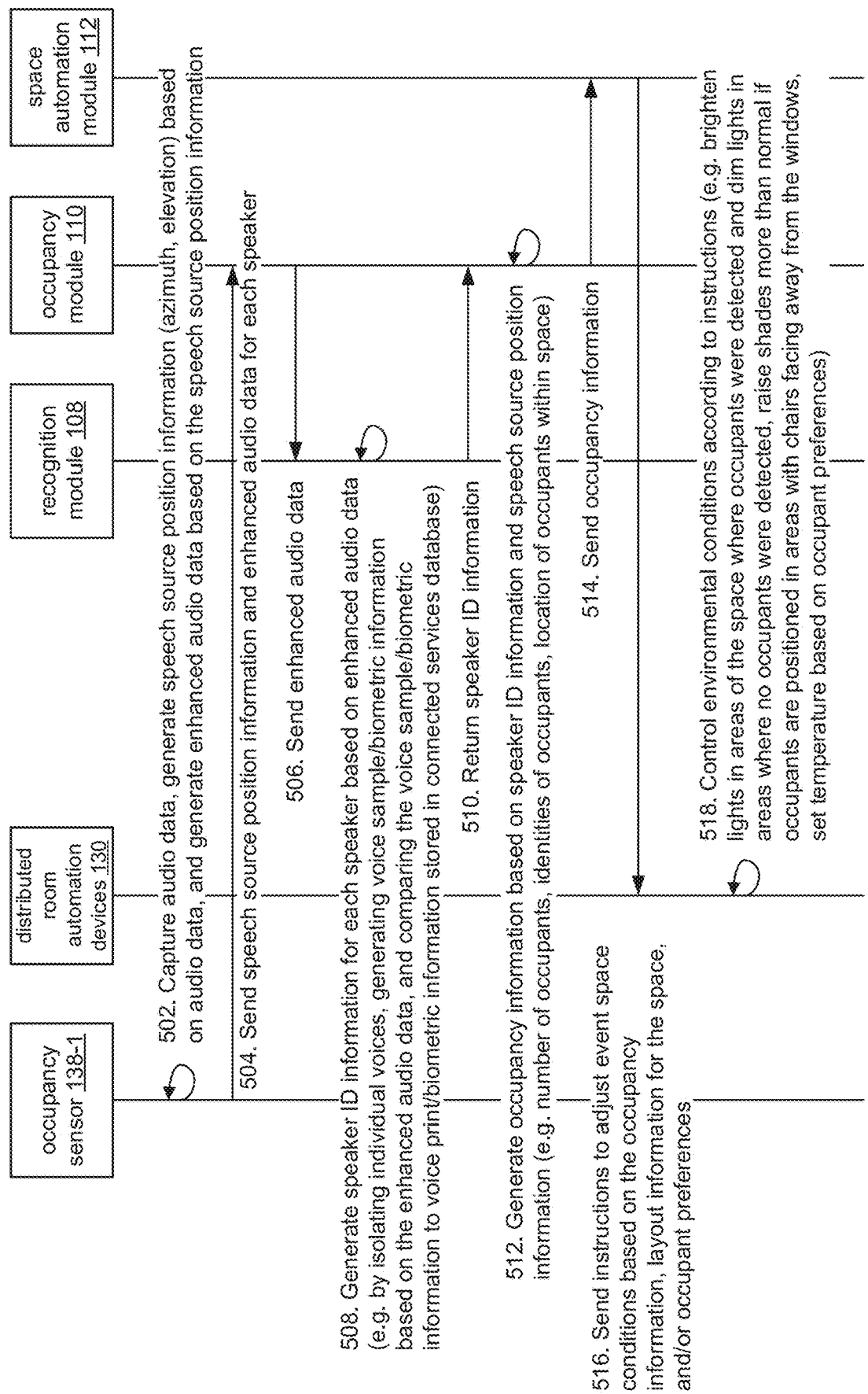
FIG. 6 is a sequence diagram illustrating the process by which occupancy information is generated based on captured speech sounds and the environmental conditions of the spaces are controlled based on the occupancy information.

FIG. 6 is a sequence diagram illustrating the process by which the occupancy information is generated based on captured speech sounds and the environmental conditions of the spaces 105 are controlled based on the occupancy information.

In step 502, the occupancy sensor 138-1 captures the speech sounds emanating from occupants 150 in the space 105 via the microphone array 218 and generates audio data. The occupancy sensor 138-1 then generates speech source position information (e.g. azimuth, elevation) based on the audio data and enhanced audio data based on the speech source position information.

In step 504, the occupancy sensor 138-1 sends the speech source position information and enhanced audio data for each source of the speech sounds (e.g. occupant 150 speaking) to the occupancy module 110.

In step 506 the occupancy module 110 forwards the enhanced audio data to the recognition module 108.

In step 508, the recognition module 108 generates identification information for each distinct source of the speech sounds based on the enhanced audio data. In one example, the recognition module 108 isolates individual voices, generates voice sample/biometric information for the voices based on the enhanced audio data, and compares the voice sample/biometric information to voice prints and/or biometric information stored for the occupants 150 in the occupant table 182 of the connected services database 106. The recognition module 108 returns the identification information for the occupant or occupants 150 in step 510.

In step 512, the occupancy module 110 generates the occupancy information (e.g. quantity, identities, and positions of occupants 150 present in the space 105). The occupancy module 110 sends the occupancy information to the space automation module 112 in step 514.

In step 516, the space automation module 112 sends instructions to the distributed room devices 130 at the space 105 to adjust the environmental conditions of the space 105 based on the occupancy information, layout information for the space 105 from the space table 180 of the connected services database 106, and/or preference information for the identified occupants 150 from the occupant table 182 of the connected services database 106.

In step 518, the distributed room devices 130 control the environmental conditions according to the instructions from the space automation module 112. In one example, the lighting units 130-4 brighten the lights in areas of the space 105 where the occupants 150 were detected and dim the lights in the areas where no occupants 150 were detected. In another example, the blinds units 130-3 raise blinds on the windows of the space 105 more than normal if occupants 150 are positioned in areas of the space 105 that are facing away from the windows. In another example, the thermostat 130-5 changes the set temperature for the space 105 based on the preference information for the present occupants 150.

Figure 7:
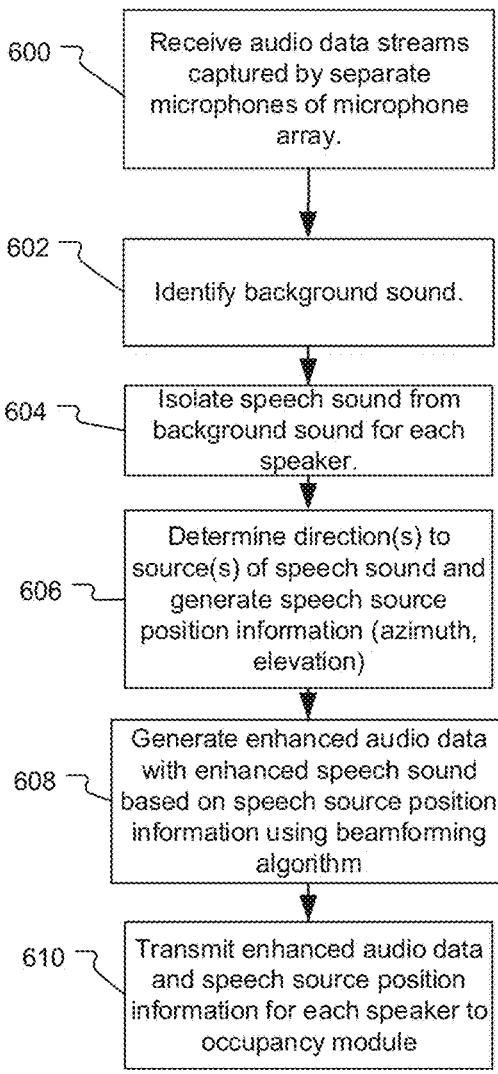
FIG. 7 is a flow diagram illustrating the process by which the occupancy sensor generates audio data and source position information.

FIG. 7 is a flow diagram illustrating the process by which the occupancy sensor 138 generates the audio data and source position information. This process corresponds with the previously described step 502 and in the illustrated embodiment is performed by the beamforming process 220 executing on the controller 216 of the occupancy sensor 138-1.

In step 600, audio data streams captured by the different microphones 302 of the microphone array 218 are received.

In step 602, the occupancy sensor 138-1 analyzes the audio data streams and detects and identifies background sound based on the audio data (e.g. rain, ambient mechanical noise).

In step 604, the occupancy sensor 138-1 isolates the speech sound from the background sound for each detected source of the speech sounds.

In step 606, the occupancy sensor 138-1 determines the directions to the different sources of the speech sounds and generates speech source position information (e.g. azimuth, elevation) indicating relative positions of the sources with respect to the occupancy sensor 138-1.

In step 608, the occupancy sensor 138-1 generates enhanced audio data (e.g. with clearer and more audible speech sounds) based on the speech source position information. In one example, the occupancy sensor 138-1 uses a beamforming algorithm to combine the streams from the different microphones with different time delays based on the speech source position information and detected properties of the signals.

In step 610, the occupancy sensor 138-1 transmits the enhanced audio data and the speech source position information for each identified source to the occupancy module 110.

Figure 8:
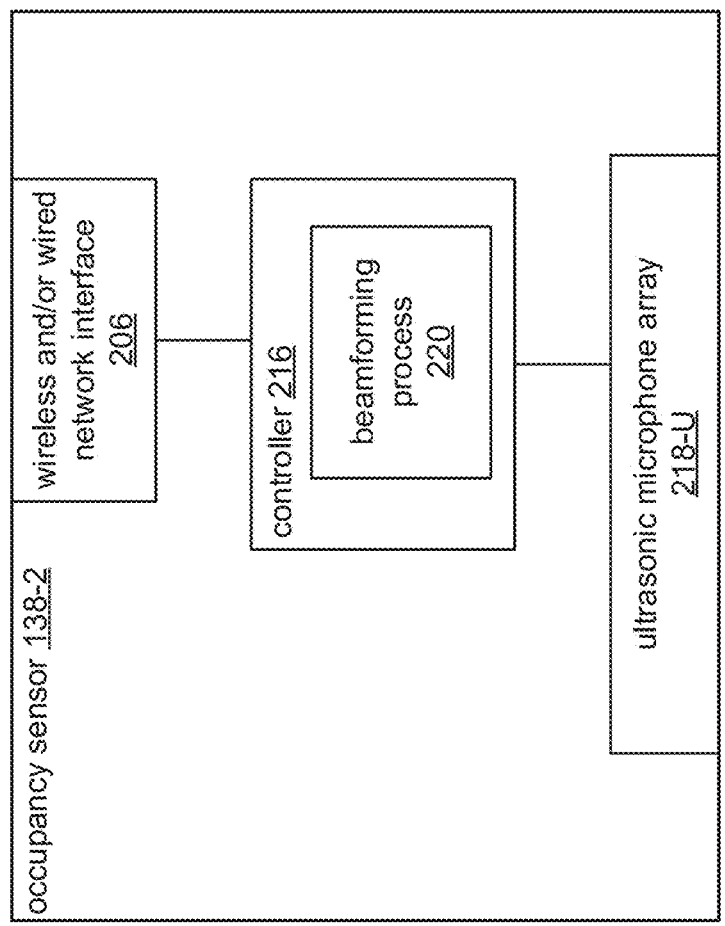
FIG. 8 is a schematic diagram illustrating an example of the occupancy sensor according to an alternative embodiment in which the microphone array specifically captures ultrasonic emissions from mobile computing devices of the occupants.

FIG. 8 is a schematic diagram illustrating an example of the occupancy sensor 138-2 according to an alternative embodiment in which the microphone array 218-U specifically captures ultrasonic emissions from the mobile computing devices 152 of occupants 150 in the space 105. As before, the occupancy sensor 138-2 includes the controller 216, beamforming process 220, and network interface 206. Now, however, the microphone array is specifically an ultrasonic microphone array 218-U with microphones capable of detecting the ultrasonic emissions from the mobile computing devices 152.

Figure 9:
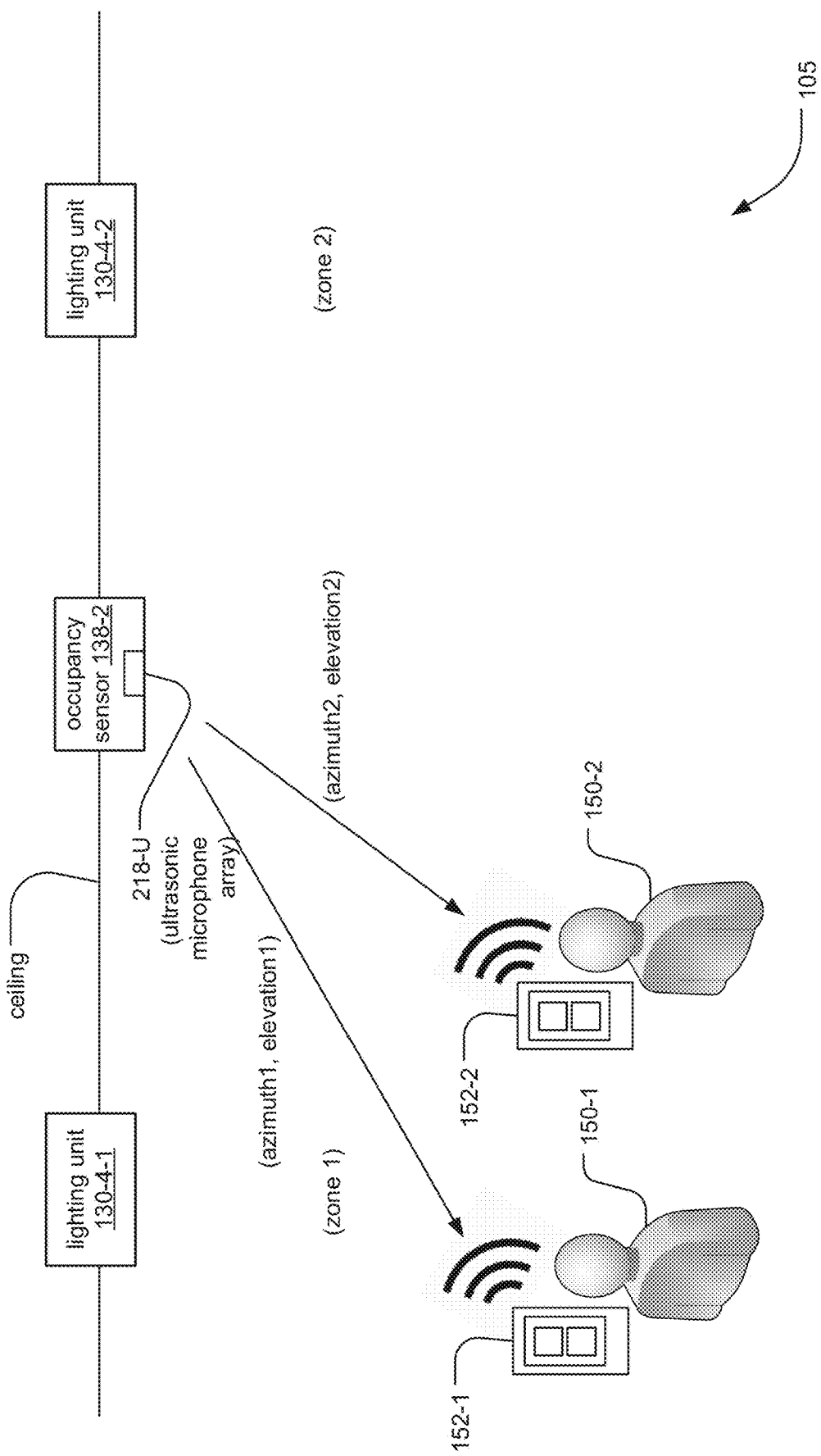
FIG. 9 is a schematic diagram of an exemplary space illustrating how the environmental conditions are controlled based on the ultrasonic emissions.

FIG. 9 is a schematic diagram of an exemplary space 105 illustrating how the environmental conditions are controlled based on the ultrasonic emissions from the mobile computing devices 152 captured by the occupancy sensor 138-2. The illustrated example is similar to that of FIG. 5. Now, however, the mobile computing devices 152 produce ultrasonic emissions, which are detected by the occupancy sensor 138-2 via the ultrasonic microphone array 218-U. The occupancy sensor 138-2 generates the source position information indicating the relative positions of the mobile computing devices 152 with respect to the occupancy sensor 138-2.

Figure 10:
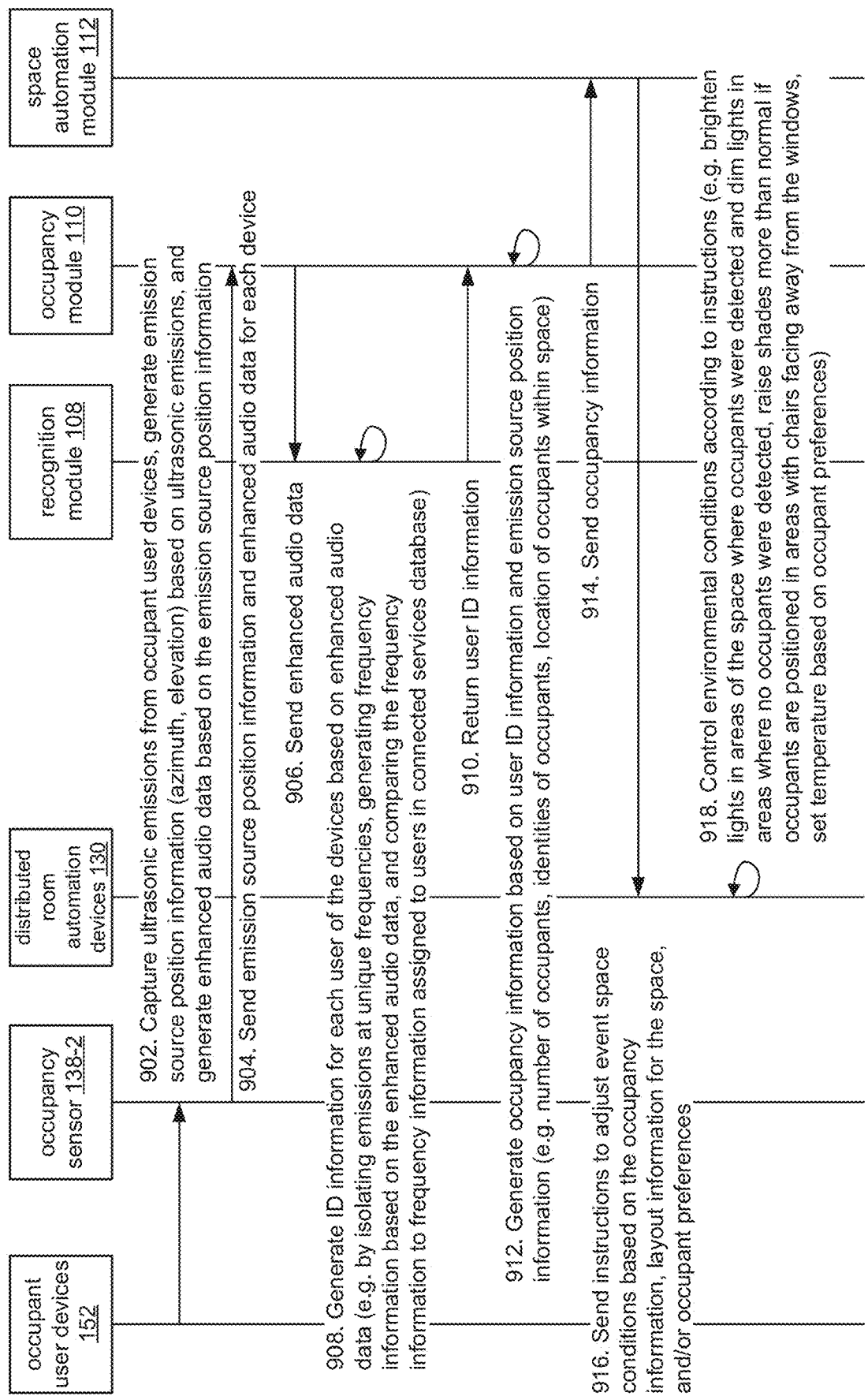
FIG. 10 is a sequence diagram illustrating the process by which the occupancy information is generated based on captured ultrasonic emissions and the environmental conditions of the spaces are controlled based on the occupancy information.

FIG. 10 is a sequence diagram illustrating the process by which the occupancy information is generated based on captured ultrasonic emissions and the environmental conditions of the spaces 105 are controlled based on the occupancy information.

In step 902, the occupancy sensor 138-2 captures the ultrasonic emissions emanating from the mobile computing devices 152 of the occupants 150 in the space 105 via the ultrasonic microphone array 218-U and generates audio data. The occupancy sensor 138-2 then generates emission source position information (e.g. azimuth, elevation) based on the audio data and enhanced audio data based on the speech source position information.

In step 904, the occupancy sensor 138-2 sends the emission source position information and enhanced audio data for each source of the ultrasonic emissions (e.g. mobile computing device 152 of the occupant 150) to the occupancy module 110.

In step 906 the occupancy module 110 forwards the enhanced audio data to the recognition module 108.

In step 908, the recognition module 108 generates identification information for each distinct source of the ultrasonic emissions based on the enhanced audio data. In one example, the recognition module 108 isolates emissions at unique frequencies, generates frequency information for the sources of the different frequencies based on the enhanced audio data, and compares the frequency information to frequency information stored for the occupants 150 in the occupant table 182 of the connected services database 106. The recognition module 108 returns the identification information for the occupants 150 in step 910.

In step 912, the occupancy module 110 generates the occupancy information (e.g. quantity, identities, and positions of occupants 150 present in the space 105). The occupancy module 110 sends the occupancy information to the space automation module 112 in step 914.

In step 916, the space automation module 112 sends instructions to the distributed room devices 130 at the space 105 to adjust the environmental conditions of the space 105 based on the occupancy information, layout information for the space 105 from the space table 180 of the connected services database 106, and/or preference information for the identified occupants 150 from the occupant table 182 of the connected services database 106.

Finally, in step 918, the distributed room devices 130 control the environmental conditions according to the instructions from the space automation module 112.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of operation of a building automation system of a building, the method comprising:
    capturing sound in spaces of the building and generating audio data based on the captured sound;
    generating occupancy information for the spaces based on the audio data; and
    controlling environmental conditions of the spaces based on the occupancy information,
    wherein the captured sound includes ultrasonic emissions originating from one or more user devices of occupants of the spaces, and the ultrasonic emissions are produced by the user devices at different frequencies for different occupants of the spaces.

2. The method as claimed in claim 1, further comprising capturing the sound via microphone arrays.

3. The method as claimed in claim 1, further comprising determining position information for sources of the sound based on the audio data.

4. The method as claimed in claim 1, further comprising capturing speech sounds originating from one or more occupants of the spaces.

5. The method as claimed in claim 1, further comprising enhancing the audio data based on position information for sources of the sound via a beamforming process.

6. The method as claimed in claim 1, wherein the occupancy information includes quantity, identity and/or location information for occupants of the space.

7. The method as claimed in claim 1, further comprising generating identification information for occupants of the spaces based on the audio data, wherein the occupancy information is generated based on the identification information.

8. The method as claimed in claim 1, further comprising controlling the environmental conditions of the spaces based on position, orientation and/or distribution information for occupants of the spaces.

9. The method as claimed in claim 1, further comprising controlling the environmental conditions of the spaces based on preference information for occupants of the spaces.

10. The method as claimed in claim 1, wherein the occupancy information for the spaces includes how many occupants are in each of the spaces.

11. The method as claimed in claim 1, further comprising generating position information for occupants of the spaces based on the audio data and controlling the environmental conditions of the spaces based on the position information for the occupants and layout information associated with the spaces.

12. The method as claimed in claim 11, further comprising controlling the environmental conditions by brightening lights in areas where the occupants are located and dimming lights in areas where no occupants are located based on the position information and the layout information.

13. The method as claimed in claim 11, further comprising controlling the environmental conditions by raising shades in areas where shades are facing away from windows of the spaces based on the position information and the layout information.

14. The method as claimed in claim 11, further comprising controlling the environmental conditions by controlling temperatures of the spaces based on the occupancy information and/or occupant preferences.

15. The method as claimed in claim 1, further comprising storing for each occupant ultrasonic frequency information indicating the different frequencies for the occupant.

16. The method as claimed in claim 15, further comprising identifying the occupants based on the ultrasonic emissions depicted in the audio data and the stored ultrasonic frequency information.

17. The method as claimed in claim 16, wherein identifying the occupants comprises isolating ultrasonic emissions at different frequencies based on the audio data, generating frequency information for the isolated ultrasonic emissions, comparing the frequency information for the isolated ultrasonic emissions to the stored frequency information for the occupants and returning identification information for each distinct source of the ultrasonic emissions.

18. A building automation system of a building, the building automation system comprising:
    occupancy sensors for capturing sounds in spaces of the building, generating audio data based on the captured sound;
    an occupancy module for generating occupancy information for the spaces based on the audio data generated by the occupancy sensors; and
    a space automation module for controlling environmental conditions of the spaces based on the occupancy information generated by the occupancy module,
    wherein the captured sound includes ultrasonic emissions originating from one or more user devices of occupants of the spaces, and the ultrasonic emissions are produced by the user devices at different frequencies for different occupants of the spaces.

19. The system as claimed in claim 18, further comprising microphone arrays of the occupancy sensors for capturing the sound.

20. The system as claimed in claim 18, wherein the occupancy sensors determine position information for sources of the sound based on the audio data.

21. The system as claimed in claim 18, wherein the sounds include speech sounds originating from one or more occupants of the spaces.

22. The system as claimed in claim 18, further comprising a beamforming process executing on controllers of the occupancy sensors for enhancing the audio data based on position information for sources of the sound.

23. The system as claimed in claim 18, wherein the occupancy information includes quantity, identity and/or location information for occupants of the space.

24. The system as claimed in claim 18, further comprising a recognition module for generating identification information for occupants of the spaces based on the audio data, wherein the occupancy information is generated based on the identification information.

25. The system as claimed in claim 18, wherein the space automation module controls the environmental conditions of the spaces based on position, orientation and/or distribution information for occupants of the spaces.

26. The system as claimed in claim 18, wherein the space automation module controls the environmental conditions of the spaces based on preference information for occupants of the spaces.

27. A system for detecting occupancy in spaces of a building, the system comprising:
    occupancy sensors for capturing sounds in the spaces and generating audio data based on the captured sound; and
    an occupancy module for generating occupancy information for the spaces based on the audio data generated by the occupancy sensors,
    wherein the captured sound includes ultrasonic emissions originating from one or more user devices of occupants of the spaces, and the ultrasonic emissions are produced by the user devices at different frequencies for different occupants of the spaces.

* * * * *